US008103097B2

(12) United States Patent
Finlayson

(10) Patent No.: US 8,103,097 B2
(45) Date of Patent: Jan. 24, 2012

(54) COLOUR INVARIANT IMAGE REPRESENTATION METHOD AND APPARATUS

(75) Inventor: Graham Finlayson, Norwich (GB)

(73) Assignee: Apple Inc., Cupertino, CA (US)

( * ) Notice: Subject to any disclaimer, the term of this patent is extended or adjusted under 35 U.S.C. 154(b) by 604 days.

(21) Appl. No.: 10/513,588

(22) PCT Filed: May 2, 2003

(86) PCT No.: PCT/GB03/01948
§ 371 (c)(1),
(2), (4) Date: Jun. 6, 2005

(87) PCT Pub. No.: WO03/094505
PCT Pub. Date: Nov. 13, 2003

(65) Prior Publication Data
US 2005/0226496 A1 Oct. 13, 2005

(30) Foreign Application Priority Data

May 3, 2002 (GB) .................................. 0210189.7

(51) Int. Cl.
*G06K 9/00* (2006.01)
(52) U.S. Cl. ........ 382/169; 382/162; 345/596; 358/3.01
(58) Field of Classification Search ................. 382/162, 382/169; 345/596; 358/3.01
See application file for complete search history.

(56) References Cited

U.S. PATENT DOCUMENTS

| | | | |
|---|---|---|---|
| 4,745,465 A | 5/1988 | Kwon | |
| 5,341,439 A | 8/1994 | Hsu | |
| 5,450,502 A | 9/1995 | Eschbach et al. | |
| 5,805,213 A * | 9/1998 | Spaulding et al. | 348/222.1 |
| 5,913,205 A * | 6/1999 | Jain et al. | 707/2 |
| 5,933,524 A * | 8/1999 | Schuster et al. | 382/168 |
| 6,122,408 A * | 9/2000 | Fang et al. | 382/274 |
| 6,829,016 B2 * | 12/2004 | Hung | 348/581 |
| 7,227,586 B2 | 6/2007 | Finlayson et al. | |
| 7,751,639 B1 | 7/2010 | Finlayson et al. | |
| 2002/0028003 A1 | 3/2002 | Krebs et al. | |
| 2003/0194116 A1 | 10/2003 | Wong et al. | |

FOREIGN PATENT DOCUMENTS

| EP | 0663094 B1 | 11/1998 |
|---|---|---|
| EP | 1 217 572 | 6/2002 |

OTHER PUBLICATIONS

John C. Russ; "The Image Processing Handbook"; CRC Press; third edition Oct. 1998; pp. 233-238.*
Merwin, et al., "Comparison of Eight Color and Gray Scales for Displaying Continuous 2D Data", *Proc. of the Human Factors and Ergonomics Society 37th Annual Meeting—1993*, vol. 2, pp. 1330-1334, Oct. 1993.
Bach, J., et al., "The Virage Image Search Engine: An Open Framework for Image Management", *SPIE Conf. on Storage and Retrieval for Image and Video Databases*, vol. 2670, pp. 76-87 (1996).
Dannemiller, J., "Rank Orderings of Photoreceptor Photon Catches from Natural Objects are Nearly Illuminant-Invariant", *Vision Research*, 33(1):131-140 (1993).
Finlayson, G., et al., "Colour Indexing Across Devices and Viewing Conditions", *2nd International Workshop on Content-Based Multimedia Indexing*, (2001).
Finlayson, G., et al., "The UEA Uncalibrated Colour Image Database", *Technical Report SYS-COO-07*, School of Information Systems, University of Anglia, Norwich, United Kingdom (2000).
Finlayson, G., et al., "Color Angular Indexing", *The 4th European Conf. on Computer Vision (vol. II)*, European Vision Society, pp. 16-27 (1996).
Finlayson, G., et al., "Comprehensive Colour Image Normalization", *eccv98*, pp. 475-490 (1998).
Finlayson, G., et al., "Coefficient Colour Constancy", PhD thesis, Chapters 2-3, Simon Fraser University (1995).
Funt, B., et al., "Is Machine Colour Constancy Good Enough?", *5th European Conf. on Computer Vision*, pp. 455-459, Springer, Jun. 1998.
Funt, B., et al., "Color Constant Color Indexing", *IEEE Transactions on Pattern Analysis and Machine Intelligence*, 17(5):522-529 (1995).
Gevers, T., et al., "Color Based Object Recognition", *Pattern Recognition*, 32:453-464 (1999).
Finlayson, G., et al., "Illuminant Estimation for Object Recognition", *COLOR Research and Application*, (2002).
Healey, G., "Using Color for Geometry-Insensitive Segmentation", *Journal of the Optical Society of America, A.*, 6:920-937 (1989).
Maxwell, B.A., et al., "A Framework for Segmentation Using Physical Models of Image Formation", *Computer Vision and Pattern Recognition, IEEE*, pp. 361-368 (1994).
Niblack, W., "The QBIC Project: Querying Images by Content Using Color, Texture and Shape", *Storage and Retrieval for Image and Video Databases I, SPIE Proc. Series*, vol. 1908 (1993).
Poynton, C., "The Rehabilitation of Gamma", *SPIE Conf., Human Vision and Electronic Imaging III*, vol. 3299, pp. 232-249 (1998).
Raja, Y., et al., "Colour Model Selection and Adaptation in Dynamic Scenes", *5th European Conference on Computer Vision*, pp. 460-474, Springer, Jun. 1998.
Schiele, B., et al., "Gaze Tracking Based on Face-Color", *International Workshop on Automatic Face- and Gesture-Recognition*, Jun. 1995.
Stricker, M., et al., "Similarity of Color Images", *SPIE Conf. on Storage and Retrieval for Image and Video Databases III*, vol. 2420, pp. 381-392 (1995).
Swain, M., et al., "Color Indexing", *International Journal of Computer Vision*, 7(1):11-32 (1991).

(Continued)

*Primary Examiner* — Vikkram Bali
*Assistant Examiner* — Eueng-Nan Yeh
(74) *Attorney, Agent, or Firm* — Fish & Richardson P.C.

(57) ABSTRACT

A color image comprises color values in each of one or more color channels for each of a plurality of points, or pixels, within the image. The image is represented by rank ordering the values in the or each color channel. The image representation generated in this way is usable for automated-vision or computer-vision tasks, for example.

24 Claims, No Drawings

OTHER PUBLICATIONS

Watt, A., et al., *The Computer Image*, Addison-Wesley (1997).

Wyszecki, G., et al., *Color Science: Concepts and Methods Quantitative Data and Formulas*, New York: Wiley, $2^{nd}$ Ed. (1982).

Dannemiller, J., "Rank Orderings of Photoreceptor Photon Catches from Natural Objects are Nearly Illuminant-Invariant", *Vision Research*, 33(1):131-140 (1993), (published before May '02).

Finlayson, G., et al., "Colour Indexing Across Devices and Viewing Conditions", $2^{nd}$ *International Workshop on Content-Based Multimedia Indexing*, (2001), (published before May '02).

Finlayson, G., et al., "The UEA Uncalibrated Colour Image Database", *Technical Report SYS-COO-07*, School of Information Systems, University of Anglia, Norwich, United Kingdom (2000), (published before May '02).

Finlayson, G., et al., "Color Angular Indexing", *The $4^{th}$ European Conf. on Computer Vision (vol. II)*, European Vision Society, pp. 16-27 (1996), (published before May '02).

Finlayson, G., et al., "Comprehensive Colour Image Normalization", *eccv98*, pp. 475-490 (1998), (published before May '02).

Finlayson, G., et al., "Coefficient Colour Constancy", PhD thesis, Chapters 2-3, Simon Fraser University (1995), (published before May '02).

Funt, B., et al., "Is Machine Colour Constancy Good Enough?", $5^{th}$ *European Conf. on Computer Vision*, pp. 455-459, Springer, Jun. 1998.

Funt, B., et al., "Color Constant Color Indexing", *IEEE Transactions on Pattern Analysis and Machine Intelligence*, 17(5):522-529 (1995), (published before May '02).

Gevers, T., et al., "Color Based Object Recognition", *Pattern Recognition*, 32:453-464 (1999), (published before May '02).

Finlayson, G., et al., "Illuminant Estimation for Object Recognition", *COLOR Research and Application*, (2002), 27(4):260-270, Aug. 2002.

Healey, G., "Using Color for Geometry-Insensitive Segmentation", *Journal of the Optical Society of America, A.*, 6:920-937 (1989), (published before May '02).

Maxwell, B.A., et al., "A Framework for Segmentation Using Physical Models of Image Formation", *Computer Vision and Pattern Recognition, IEEE*, pp. 361-368. (1994), (published before May '02).

Niblack, W., "The QBIC Project: Querying Images by Content Using Color, Texture and Shape", *Storage and Retrieval for Image and Video Databases I, SPIE Proc. Series*, vol. 1908 (1993).

Poynton, C., "The Rehabilitation of Gamma", *SPIE Conf., Human Vision and Electronic Imaging III*, vol. 3299, pp. 232-249 (1998), (published before May '02).

Raja, Y., et al., "Colour Model Selection and Adaptation in Dynamic Scenes", $5^{th}$ *European Conference on Computer Vision*, pp. 460-474, Springer, Jun. 1998.

Stricker, M., et al., "Similarity of Color Images", *SPIE Conf. on Storage and Retrieval for Image and Video Databases III*, vol. 2420, pp. 381-392 (1995), (published before May '02).

Swain, M., et al., "Color Indexing", *International Journal of Computer Vision*, 7(1):11-32 (1991), (published before May '02).

Watt, A., et al., *The Computer Image*, Addison-Wesley (1997), (published before May '02).

Wyszecki, G., et al., *Color Science: Concepts and Methods Quantitative Data and Formulas*, New York: Wiley, $2^{nd}$ Ed. (1982), (published before May '02).

Wikipedia, "Rankit," retrieved from the Internet on Feb. 2, 2010, at http://en.wikipedia.org/Rankit, 3 pages.

European Patent Office, European Patent Application No. 03722835.0, in European Search Report, mailed Feb. 16, 2010, 5 pages.

Hasket et al., "Aided/Automatic Target Detection Using Reflective Hyperspectral Imagery For Airborne Applications", Dec. 1998, 19 pages.

Pitas et al., "Multivariate Ordering in Color Image Filtering", IEEE Transactions on Circuits and Systems for Video Technology, vol. 1, No. 3, Sep. 1991, 15 pages.

Weeks et al., "Histogram Specification of 24-bit Color Images in the Color Difference (C-Y) Color Space," Part of the IS&T/SPIE Conference on Nonlinear Image Processing X, San Jose, CA, Jan. 1999, SPIE vol. 3646, 11 pages.

Russ, John, "Image Analysis Consulting & Training," Jun. 27, 2009, 90 pages.

\* cited by examiner

COLOUR INVARIANT IMAGE REPRESENTATION METHOD AND APPARATUS

Colour can potentially provide useful information to a variety of computer vision tasks such as image segmentation, image retrieval, object recognition and tracking. However, for it to be helpful in practice, colour must relate directly to the intrinsic properties of the imaged objects and be independent of imaging conditions such as scene illumination and the imaging device. To this end many invariant colour representations have been proposed in the literature. Unfortunately, recent work [3] has shown that none of them provides good enough practical performance.

SUMMARY OF THE INVENTION

The invention provides a method and an apparatus for representing, characterising, transforming or modifying a colour image as defined in the appended independent claims. Preferred or advantageous features of the invention are set out in dependent subclaims.

In this paper we propose a new colour invariant image representation based on an existing grey-scale image enhancement technique: histogram equalisation. We show that provided the rank ordering of sensor responses are preserved across a change in imaging conditions (lighting or device) a histogram equalisation of each channel of a colour image renders it invariant to these conditions. We set out theoretical conditions under which rank ordering of sensor responses is preserved and we present empirical evidence which demonstrates that rank ordering is maintained in practice for a wide range of illuminants and imaging devices. Finally we apply the method to an image indexing application and show that the method outperforms all previous invariant representations, giving close to perfect illumination invariance and very good performance across a change in device.

1 INTRODUCTION

It has long been argued that colour (or RGB) images provide useful information which can help in solving a wide range of computer vision problems. For example it has been demonstrated [14, 1] that characterising an image by the distribution of its colours (RGBS) is an effective way to locate images with similar content from amongst a diverse database of images. Or that a similar approach [19] can be used to locate objects in an image. Colour has also been found to be useful for tasks such as image segmentation [12, 13] and object tracking [7, 16]. Implicit in these applications of colour is the assumption that the colours recorded by devices are an inherent property of the imaged objects and thus a reliable cue to their identity. Unfortunately a careful examination of image formation reveals that this assumption is not valid. The RGB that a camera records is more properly a measure of the light reflected from the surface of an object and while this does depend in part on characteristics of the object, it depends in equal measure on the composition of the light which is incident on the object in the first place. So, an object that is lit by an illuminant which is itself reddish, will be recorded by a camera as more red than will the same object lit under a more bluish illuminant That is, image RGBs are illumination dependent. In addition image colour also depends on the properties of the recording device. Importantly, different imaging devices have different sensors which implies that an object that produces a given RGB response in one camera might well produce a quite different response in a different device.

In recognition of this fact many researchers have sought modified image representations such that one or more of these dependencies are removed. Researchers have to-date, concentrated on accounting for illumination dependence and typically adopt one of two approaches: colour invariant [9, 5, 6, 10, 18] or colour constancy [11, 8] methods. Colour invariant approaches seek transformations of the image data such that the transformed data is illuminant independent whereas colour constancy approaches set out to determine an estimate of the light illuminating a scene and provide this estimate in some form to subsequent vision algorithms.

Colour constancy algorithms, in contrast to invariant approaches can deliver true object colours. Moreover, colour invariants can be calculated post-colour constancy processing but the converse is not true. This said, colour constancy has proven to be a harder problem to solve than colour invariants. Most importantly however, it has been demonstrated [8, 3] that the practical performance of neither approach is good enough to facilitate colour-based object recognition or image retrieval. Moreover, none of the methods even attempts to account for device dependence.

In this paper we seek to address the limitations of these existing approaches by defining a new image representation which we show is both illumination independent and (in many cases) also device independent Our method is based on the observation that while a change in illumination or device leads in practice to significant changes in the recorded RGBs, the rank orderings of the responses of a given sensor are largely preserved. In facts we show in this paper (§3) that under certain simplifying assumptions, invariance of rank ordering follows directly from the image formation equation. In addition we present an empirical study (§4) which reveals that the preservation of rank ordering holds in practice both across a wide range of illuminants and a variety of imaging devices. Thus, an image representation which is based on rank ordering of recorded RGBs rather than on the RGBs themselves offers the possibility of accounting for both illumination and device dependence at the same time.

To derive an image representation which depends only on rank orderings we borrow a tool which has long been used by the image processing community for a quite different purpose. The technique is histogram equalisation and is typically applied to grey-scale images to produce a new image which is enhanced in the sense that the image has more contrast and thus conveys more information. In some cases this results in a visually more pleasing image. But in a departure from traditional image processing practice, we apply the procedure not to a grey-scale image, but rather to each of the R, G, and B channels of a colour image independently of one another. We show that provided two images differ in such a way as to preserve the rank ordering of pixel values in each of the three channels then an application of histogram equalisation to each of the channels of the two images results in a pair of equivalent images. Thus provided a change in illuminant or device preserves rank ordering of pixel responses the application of histogram equalisation will provide us with an invariant representation of a scene which might subsequently be of use in a range of vision applications.

Of course the reader may be surprised that we propose something so simple: histogram equalisation is a common tool. Paradoxically however, histogram equalising R, G, and B channels of an image is generally discouraged because this results in unnatural pseudo-colours. For our purposes, however—recognition or tracking—pseudo-colours suffice. We demonstrate this (§5) by applying the method to the problem of colour indexing: we show that the method out performs all previous approaches and in the case of a change in illumination provides close to perfect indexing.

2 BACKGROUND

We base our work on a simple model of image formation in which the response of an imaging device to an object depends on three factors: the light by which the object is lit, the surface reflectance properties of the object, and the properties of the device's sensors. We assume that a scene is illuminated by a single light characterised by its spectral power distribution which we denote $E(\lambda)$ and which specifies how much energy the source emits at each wavelength ($\lambda$) of the electromagnetic spectrum. The reflectance properties of a surface are characterised by a function $S(\lambda)$ which defines what proportion of light incident upon it the surface reflects on a perwavelength basis. Finally a sensor is characterised by $R_k(\lambda)$, its spectral sensitivity function which specifies its sensitivity to light energy at each wavelength of the spectrum. The subscript k denotes that this is the kth sensor. Its response is defined as:

$$p_k = \int_\omega E(\lambda)S(\lambda)R_k(\lambda)\,d\lambda, k = 1, \ldots, m \quad (1)$$

where the integral is taken over the range of wavelengths $\omega$: the range for which the sensor has non-zero sensitivity. In what follows we assume that our devices (as most devices do) have three sensors (m=3) so that the response of a device to a point in a scene is represented by a triplet of values: ($p_1$, $p_2$, $p_3$) It is common to denote these triplets as R, G, and B or just RGBs and so we use the different notations interchangeably throughout. An image is thus a collection of RGBs representing the device's response to light from a range of positions in a scene.

Equation (1) makes clear the fact that a device response depends both on properties of the sensor (it depends on $R_k(\lambda)$) and also on the prevailing illumination on ($E(\lambda)$). That is, responses are both device and illumination dependent. It follows that if no account is taken of these dependencies, an RGB cannot correctly considered to be an intrinsic property of an object and is employing it as such is quite likely to result in poor results.

An examination of the literature reveals many attempts to deal with the illumination dependence problem. One approach is to apply a correction to the responses recorded by a device to account for the colour of the prevailing scene illumination. Provided an accurate estimate of the scene illumination can be obtained, such a correction accounts well for the illumination dependence, rendering responses colour constant: that is stable across a change in illumination. The difficulty with this approach is the fact that estimating the scene illuminant is non-trivial. In 1998 Funt et al [8] demonstrated that existing colour constancy algorithms are not sufficiently accurate to make such an approach viable. More recent work [11] has shown that for simple imaging conditions and given good device calibration the colour constancy approach can work.

A different approach is to derive from the image data some new representation of the image which is invariant to illumination. Such approaches are classified as colour (or illuminant) invariant approaches and a wide variety of invariant features have been proposed in the literature. Accounting for a change in features have been proposed in the literature. Accounting for a change in illumination colour is however difficult because, as is clear from Equation (1), the interaction between light, surface and sensor is complex. Researchers have attempted to reduce the complexity of the problem by adopting simple models of illumination change. One of the simplest models is the so called diagonal model in which it is proposed that sensor responses under a pair of illuminants are related by a diagonal matrix transform:

$$\begin{pmatrix} R^c \\ G^c \\ B^c \end{pmatrix} = \begin{pmatrix} \alpha & 0 & 0 \\ 0 & \beta & 0 \\ 0 & 0 & \gamma \end{pmatrix} \begin{pmatrix} R^o \\ G^o \\ B^o \end{pmatrix} \quad (2)$$

where the superscripts o and c characterise the pair of illuminants. The model is widely used, and has been shown to be well justified under many conditions [7]. Adopting such a model one simple illuminant invariant representation of an image can be derived by applying the following transform:

$$R' = \frac{R}{R_{ave}}, G' = \frac{G}{G_{ave}}, B' = \frac{B}{B_{ave}} \quad (3)$$

where the triplet trial ($R_{ave}$, $G_{ave}$, $B_{ave}$) denotes the mean of all RGBs in an image. It is easy to show that this so called Greyworld representation of an image is illumination invariant provided that Equation (2) holds.

Many other illuminant invariant representations have been derived, in some cases [10] by adopting different models of image formation. All derived invariants however share two common failings: first it has been demonstrated that when applied to the practical problem of image retrieval none of these invariants affords good enough performance across a change in illumination. Secondly, none of these approaches considers the issue of device invariance.

Device invariance occurs because different devices have different spectral sensitivity functions (different $R_k$ in Equation (1)) but also because the colours recorded by a device are often not linearly related to scene radiance as Equation (1) suggests, but rather are some non-linear transform of this:

$$p_k = f\left(\int_\omega E(\lambda)S(\lambda)R_k(\lambda)\,d\lambda\right), k = 1, \ldots, m \quad (4)$$

The transform f( ) is deliberately applied to RGB values recorded by a device for a number of reasons. First, many captured images will eventually be displayed on a monitor. Importantly colours displayed on a screen are not a linear function of the RGBs sent to the monitor. Rather, there exists a power function relationship between the incoming voltage and the displayed intensity. This relationship is known as the gamma of the monitor, where gamma describes the exponent of the power function [15]. To compensate for this gamma function images are usually stored in a way that reverses the effect of this transformation: that is by applying a power function with exponent of 1/$\gamma$, where $\gamma$ describes the gamma of the monitor, to the image RGBs. Importantly monitor gammas are not unique but can vary from system to system and so images from two different devices will not necessarily have the same gamma correction applied. In addition to gamma correction other more general non-linear "tone curve" corrections are often applied to images so as to change image contrast with the intention of creating a visually more pleasing image. Such transformations are device, and quite often, image dependent and so lead, inevitably to device dependent colour. In the next section we address the limitations of existing invariant approaches by introducing a new invariant representation.

3 HISTOGRAM EQUALISATION FOR COLOUR INVARIANCE

Let us begin by considering again the diagonal model of image formation defined by Equation (2). We observe that one implication of this model of illumination change is that the rank ordering of sensor responses is preserved under a change of illumination. To see this, consider the responses to a single sensor R, such that $R^o_i$ represents the response to a surface i under an illuminant o. Under a second illuminant, which we denote c, the surface will have response $R^c_i$ and the pair of sensor responses are related by:

$$R_i^c = \alpha R_i^o \quad (5)$$

Equation (5) is true for all surfaces (that is, $\forall$ i). Now, consider a pair of surfaces, i and j, viewed under illuminant o and suppose that $R^o_i > R^o_j$, then it follows from Equation (5) that:

$$R_i^o > R_j^o \Rightarrow \alpha R_i^o > \alpha R_j^o \Rightarrow R_i^c > R_j^c \; \forall i,j, \forall:\alpha \quad (6)$$

That is, the rank ordering of sensor responses within a given channel is invariant to a change in illumination Thus, if what we seek is an image representation which is invariant to illumination we can obtain one by considering not the pixel values themselves but rather the relative ordering of these values. There are a number of ways we might employ this rank ordering information to derive an invariant representation, we set forth one such method here which we will demonstrate has a number of interesting properties. To understand our method consider a signal channel of an RGB image recorded under an illuminant o where without loss of generality we restrict the range of $R^o$ to be on some finite interval: $R^o \in [0 \ldots R_{max}]$, where $R_{max}$ represents a maximum value for the finite interval. Now, consider further a value $R^o_i \in [0 \ldots R_{max}]$ where $R^o_i$ is not necessarily the value of any pixel in the image. Let us define by $P(R^o < R^o_i)$, the number of pixels in an image with a value less than or equal to $R^o_i$. Under a second illuminant, c, a pixel value $R^o$ under illuminant o is mapped to a corresponding value $R_c$. We denote by $P(R^c < R^c_i)$ the number of pixel values in the second image whose value is less than $R^c_i$. Assuming that the illumination change preserves rank ordering of pixels we have the following relation:

$$P(R^c < R_i^c) = P(R^o < R_i^o) \quad (7)$$

That is, the number of pixels in our image under illuminant o which have a value less than $R^o i$ is equal to the number of pixels in the image under illuminant c which have a value less than the transformed pixel value $R^c_i$: a change in illumination preserves cumulative proportions. Given this, we define one channel of the invariant image representation thus:

$$R_i^{inv} = \frac{R_{max}}{N_{pix}} P(R^o \leq R_i^o) = P(R^c \leq R_i^c) \quad (8)$$

where $N_{pix}$ is the number of pixels and the constant $R_{max} N_{pix}$ ensures that the invariant image has the same range of values as the input image. Repeating the procedure for each channel of a colour image results in the required invariant image.

The reader familiar with the image processing literature might recognise Equation (8). Indeed this transformation of image data is one of the simplest and most widely used methods for image enhancement and is commonly known as histogram equalisation. Histogram equalisation is an image enhancement technique originally developed for a single channel, or grey-scale, image. The aim is to increase the overall contrast in the image since doing so typical brightens dark areas of an image, increasing the detail in those regions which in turn can sometimes result in a more pleasing image. Histogram equalisation achieves this aim by transforming an image such that the histogram of the transformed image is as close as possible to a uniform histogram. The approach is justified on the grounds that amongst all possible histograms, a uniformly distributed histogram has maximum entropy. Maximising the entropy of a distribution maximises its information and thus histogram equalising an image maximises the information content of the output image. Accepting the theory, to histogram equalise an image we must transform the image such that the resulting image histogram is uniform. Now, suppose that $x_i$ represents a pixel value in the original image and $x'_i$ its corresponding value in the transformed image. We would like to transform the original image such that the proportion of pixels less than $x'_i$ in the transformed image is equal to the proportion of image pixels less than $x_i$ in the original image, and that moreover the histogram of the output image is uniform This implies:

$$\int_0^{x_i} p(x)dx = \int_0^{x'_i} q(x)dx = \frac{N_{pix}}{x_{max}} \int_0^{x'_i} dx \quad (9)$$

where p(x) and q(x) are the histograms of the original and transformed images respectively. Evaluating the right-hand integral we obtain:

$$\frac{x_{max}}{N_{pix}} \int_0^{x_i} p(x)dx = x'_i \quad (10)$$

Equation (10) tells us that to histogram equalize an image we transform pixel values such that a value $x_i$ in the original image is replaced by the proportion of pixels in the original image which are less than or equal to $x_i$. A comparison of Equation (8) and Equation (10) reveals that, disregarding notation, the two are the same, so that our invariant image is obtained by simply histogram equalising each of the channels of our original image.

In the context of image enhancement it is argued [20] that applying an equalisation to the channels of a colour image separately is inappropriate since this can produce significant colour shifts in the transformed image. However our context we are interested not in the visual quality of the image but in obtaining a representation which is illuminant and/or device invariant. Histogram equalisation achieves just this provided that the rank ordering of sensor responses is itself invariant to such changes. In addition, by applying histogram equalisation to each of the colour channels we maximise the entropy in each of those channels. This in itself seems desirable since our intent in computer vision is to use the representation to extract information about the scene and thus maximising the information content of our scene representation ought to be helpful in itself.

4 INVARIANCE OF RANK ORDERING

The analysis above shows that the illuminant invariance of histogram equalised images follows directly from the assumption of a diagonal model of illumination change (Equation (2)). But the method does not require Equation (2) to hold to provide invariance. Rather, we require only that rank orderings of sensor responses remain (approximately) invariant under a change in illumination. In fact, the method is not restricted to a change in lighting but to any transformation of the image which leaves rank orderings unchanged. Consider for example Equation (3) which allows the image formation process to include an arbitrary nonlinear transform (denoted by f( )) of sensor responses). Different transforms f( ), lead of course to different images. But note that, the rank ordering of sensor responses will be preserved provided that f( ) is a monotonic increasing function. Thus, histogram equalised images are invariant to monotonic increasing functions. This fact is important because many of the transformations such as gamma or tone-curve corrections which are applied to images, satisfy the condition of monotonicity.

To investigate further the rank invariance of sensor responses we conducted a similar experiment to that of Dannemiller [2] who investigated to what extent the responses of cone cells in the human eye maintain their rank ordering under a change in illumination. He found that to a very good approximation rank orderings were maintained. Here, we extend the analysis to investigate a range of different devices in addition to a range of illuminants. To investigate the invariance of rank orderings of sensor responses for a single device under changing illumination we proceed as follows. Let $R_k$ represent the spectral sensitivity of the kth sensor of the device we wish to investigate. Now suppose we calculate (according to Equation (1)) the responses of this sensor to a set of surface reflectance functions under a fixed illuminant $E^1(\lambda)$. We denote those responses by the vector $P^1_k$. Similarly we denote by $P^2_k$ the responses of the same sensor to the same surfaces viewed under a second illuminant $E^2(\lambda)$. Next we define a function rank( ) which takes a vector argument and returns a vector whose elements contain the rank of the corresponding element in the argument Then, if sensor responses are invariant to the illuminants $E^1$ and $E^2$, the following relationship must hold:

$$\text{rank}(P_k^1) = \text{rank}(P_k^2) \quad (11)$$

In practice the relationship in Equation (11) will hold only approximately and we can assess how well the relationship holds using Spearman's Rank Correlation coefficient which is given by:

$$\rho = 1 - 6 \sum_{j=1}^{N} \frac{d_j^2}{N_s(N_s^2 - 1)} \quad (12)$$

where $d_j$ is the difference between the jth elements of rank $(P^1_k)$ and rank $(P^2_k)$ and $N_s$ is the number of surfaces. This coefficient takes a value between 0 and 1: a coefficient of zero implies that Equation (11) holds not at all, while a value of one will be obtained when the relationship is exact. Invariance of rank ordering across devices can be assessed in a similar way by defining two vectors: $P^1_k$ defined as above and $Q_k$ representing sensor responses of the kth class of sensor of a second device under the illuminant $E^1$. By substituting these vectors in Equation (12) we can measure the degree of rank correlation. Finally we can investigate rank order invariance across device and illumination together by comparing, for example, the vectors $P^2_k$ and $Q^1_k$.

We conducted such an analysis for a variety of imaging devices and illuminants, taking as our surfaces, a set of 462 Munsell chips [21] which represent a wide range of reflectances that might occur in the world. For illuminants we chose 16 different lights, including a range of daylight illuminants, Planckian blackbody radiators, and fluorescent lights, again representing a range of lights which we will meet in the world. Finally, we used the spectral sensitivities of the human colour matching functions [21] as well as those of four digital still cameras and a flatbed scanner.

TABLE 1

Spearman's Rank Correlation Coefficient for each sensor of a range of devices. Results are averaged over all pairs of a set of 16 illuminants.

|  | $1^{st}$ Sensor | $2^{nd}$ Sensor | $3^{rd}$ Sensor |
|---|---|---|---|
| Across Illumination | | | |
| Colour Matching Functions | 0.9957 | 0.9922 | 0.9992 |
| Camera 1 | 0.9983 | 0.9984 | 0.9974 |
| Camera 2 | 0.9978 | 0.9938 | 0.9933 |
| Camera 3 | 0.9979 | 0.9984 | 0.9972 |
| Camera 4 | 0.9981 | 0.9991 | 0.9994 |
| Scanner | 0.9975 | 0.9989 | 0.9995 |
| Across Devices | | | |
| Illuminant | | | |
| Daylight (D65) | 0.9877 | 0.9934 | 0.9831 |
| Fluorescent (cwf) | 0.9931 | 0.9900 | 0.9710 |
| Tungsten (A) | 0.9936 | 0.9814 | 0.9640 |
| Across Device and Illuminant | | | |
|  | 0.9901 | 0.9886 | 0.9774 |

Table 1 summarises the results for the case in which sensor is fixed and illumination is allowed to change, using the measure defined by Equation (12). Values are shown for each device averaged over all 16 illuminants in our illuminant set, for three illuminants (daylight, fluorescent, and tungsten) averaged over all devices, and for all devices and illuminants. In all cases, the results show a very high degree of correlation: average correlation never falls below 0.964 which represents a high degree of correlation. Minimum correlation over all devices and illuminants was 0.9303 for the $1^{st}$ sensor, 0.9206 for the $2^{nd}$ sensor and 0.8525 for the $3^{rd}$. Thus on the basis of these results we conclude that rank orderings are preserved to a very good approximation across a change in either or both, device and illumination.

5 AN APPLICATION TO COLOUR INDEXING

To test the invariance properties of histogram equalisation further we applied the method to an image retrieval task Finlayson et al [3] recently investigated whether existing invariant approaches were able to facilitate good enough image indexing across a change in either, or both illumination and device. Their results suggested that the answer to this question was no. Here we repeat their experiment but using histogram equalised images as our basis for indexing to investigate what improvement, if any, the method brings.

TABLE 2

Average Match Percentile results of the indexing experiment for four different cases: (1) Across Illumination, (2) Across cameras, (3) Across scanners, and (4) Across all devices.

| Colour Model | Case (1) | Case (2) | Case (3) | Case (4) |
|---|---|---|---|---|
| RGB | 63.23 | 71.85 | 98.88 | 65.53 |
| Greyworld | 93.96 | 94.22 | 99.34 | 92.28 |
| Hist Eq. | 96.72 | 95.52 | 98.94 | 94.54 |

The experiment is based on a database of images of coloured textures captured under a range of illuminants and devices and described in [4]. In summary there are 28 different coloured textures each captured under six different devices (4 cameras and 2 scanners). In addition each camera was used to capture each of the textures under 3 different lights so that in total there are (3×4+2)×28=392 images. In image indexing terms this is a relatively small database and it is chosen because it allows us to investigate performance across a change in illumination and device. In our experiments we tested indexing performance across three different conditions: (1) across illumination, (2) across homogenous devices, and (3) across heterogeneous devices. In each case the experimental procedure was as follows. First, we choose a set of 28 images all captured under the same conditions (same device and illuminant) to be our image database. Next we select from the remaining set of images a subset of appropriate query images. So, if we are testing performance across illumination, we select as our very images the 56 images captured by the device corresponding to the database images, under the two non-database illuminants. Then for all database and query images we derive an invariant image using either the histogram equalisation method set forth above, or one of a range of previously published [9, 5, 6, 10, 18] invariant methods. Finally we represent the invariant image by its colour distribution: that is, by a histogram of the pixel values in the invariant image. All results reported here are based on 3-dimensional histograms of dimension 16×16×16.

Indexing is performed for a query image by comparing its histogram to each of the histograms of the database images. The database image whose histogram is most similar to the query histogram is retrieved as a match to the query image. We compare histograms using the intersection method described by Swain et al [19] which we found to give the best results on average. Indexing performance is measured using average match percentile [19] which gives a value between 0 is and 100%. A value of 99% implies that the correct image is ranked amongst the top 1% of images whilst a value of 50% corresponds to the performance we would achieve using random matching.

Table 2 summarises the average match percentile results for the four different conditions. In addition to results for histogram equalisation we also show results based on histograms of the original images (RGB), and on Greyworld normalised images, that is on images calculated according to Equation (3). Results for a variety of other invariant representations can be found in [3]: all perform significantly worse than Greyworld. Significantly histogram equalisation outperforms Greyworld for all conditions. Histogram equalisation results across a change in illumination are very good: an AMP of close to 97% as compared to 94% for the second best method. Results of matching across homogeneous devices (Cases 2 and 3 in Table 2) show that both Greyworld and histogram equalisation perform similarly with histogram equalisation performing slightly better on average. Finally across heterogeneous devices histogram equalisation performs best.

While the results are quite good: the histogram equalisation method clearly outperforms all other methods on average, the experiment does raise a number of issues. First, it is surprising that one of the simplest invariants—Greyworld—performs as well as it does, whilst other more sophisticated invariants perform very poorly. This performance indicates that for this dataset a diagonal scaling of sensor responses accounts for most of the change that occurs when illuminant or device is changed. It also suggests that any non-linear transform applied to the device responses post-capture (the function f( ) in Equation (2)) must be very similar for all devices: most likely a simple power function is applied Secondly, we might have expected that histogram equalisation would have performed somewhat better than it does. In particular, while illumination invariance is very good, device invariance is somewhat less than we might have hoped for given the analysis in Section 4. An investigation of images for which indexing performance was poor reveals a number of artefacts of the capture process which might account for the performance. First, a number of images captured under tungsten illumination have values of zero in the blue channel for many pixels. Second, a number of the textures have uniform backgrounds but the scanning process introduces significant non-uniformities in these regions. For both cases the resulting histogram equalised images are far from invariant. Excluding these images leads to a significant improvement in indexing performance. However, for an invariant image representation to be of practical use in an uncalibrated environment it must be robust to the limitations of the imaging process. Thus we have reported results including all images. And we stress again in summary, that the simple technique of histogram equalisation, posited only on the invariance of rank ordering across illumination and/or device outperforms all previous invariant methods and in particular gives excellent performance across changes in illumination.

REFERENCES

[1] J. Bach, C. Fuller, A Gupta, A Hampapur, B. Horowitz, R Humphrey, and R. Jain. The virage image search engine: An open framework for image management. In *SPIE Conf. on Storage and Retrieval for Image and Video Databases*, volume 2670, pages 76-87, 1996.

[2] James L. Dannemiller. Rank orderings of photoreceptor photon catches from natural objects are nearly illuminant-invariant. *Vision Research,* 33(1):131-140, 1993.

[3] G. Finlayson and G. Schaefer. Colour indexing across devices and viewing conditions. In *2nd International Workshop on Content-Based Multimedia Indexing,* 2001.

[4] G. Finlayson, G. Schaefer, and G. Y. Tian. The UEA uncalibrated colour image database. Technical Report SYS-COO-07, School of Information Systems, University of East Anglia, Norwich, United Kingdom, 2000.

[5] G. D. Finlayson, S. S. Chatteijee, and B. V. Funt. Color angular indexing. In *The Fourth European Conference on Computer Vision* (Vol II), pages 16-27. European Vision Society, 1996.

[6] G. D. Finlayson, B. Schiele, and J. Crowley. Comprehensive colour image normalization. In eccv98, pages 475-490, 1998.

[7] Graham Finlayson. *Coefficient Colour Constancy*. PhD thesis, Simon Fraser University, 1995.

[8] Brian Funt, Kobus Baxnard, and Lindsay Martin. Is machine colour constancy good enough? In *5th European Conference on Computer Vision*, pages 455-459. Springer, June 1998.

[9] Brian V. Funt and Graham D. Finlayson. Color Constant Color Indexing. *IEEE Transactions on Pattern Analysis and Machine Intelligence,* 17(5):522-529, 1995.

[10] T. Gevers and A. W. M. Smeulders. Color based object recognition *Pattern Recognition,* 32:453-464, 1999.

[11] Graham. D. Finlayson, Steven Hordley, and Paul Hubel. Illiminant estimation for object recognition. *COLOR research and application,* 2002. to appear.

[12] G. Healey. Using color for geometry-insensitive segmentation. *Journal of the Optical Society of America, A.,* 6:920-937, 1989.

[13] B. A. Maxwell and S. A. Shafer. A framework for segmentation using physical models of image formation. *In Computer vision and Pattern recognition*, pages 361-368. IEEE, 1994.

[14] W. Niblack and R. Barber. The QBIC project: Querying images by content using color, texture and shape. *In Storage and Retrieval for Image and Video Databases I*, volume 1908 of SPIE Proceedings Series. 1993.

[15] C. Poynton. The rehabilitation of gamma. In *SPIE Conf. Human Vision and Electronic Imaging III*, volume 3299, pages 232-249, 1998.

[16] Yogesh Raja, Stephen J. McKenna, and Shaogang Gong. Colour model selection and adaptation in dynamic scenes. In *5th European Conference on Computer Vision*, pages 460-474. Springer, June 1998.

[17] B. Schiele and A. Waibel. Gaze tracking based on face-color. In *International Workshop on Automatic Face- and Gesture-Recognition*, June 1995.

[18] M. Stricker and M. Orengo. Similarty of color images. In *SPIE Conf. on Storage and Retrieval for Image and Video Databases III*, volume 2420, pages 381-392, 1995.

[19] Michael J. Swain and Dana H. Ballard. Color Indexing. *International Journal of Computer Vision*, 7(1):11-32, 1991.

[20] Alan Watt and Fabio Policarpo. *The Computer Image*. Addison-Wesley, 1997.

[21] G. Wyszecli and W. S. Stiles. *Color Science: Concepts and Methods, Quantitative Data and Formulas*. New York: Wiley, 2nd edition, 1982.

The invention claimed is:

1. A method performed by one or more processes executing on a machine, the method comprising:
accessing a first color image having values in RGB channels for each of a plurality of points within the first color image, wherein the RGB channels comprise a red (R) channel, a green (G) channel, and a blue (B) channel;
generating a first pseudo-color image at least in part by applying histogram-equalization transformations to the values in the RGB channels of the first color image independently of the values in the other RGB channels of the first color image, such that the generated first pseudo-color image is invariant to both (i) illumination conditions of a scene depicted in the first color image and (ii) response of an imaging device that acquired the first color image;
generating a three-dimensional RGB histogram of the first pseudo-color image;
identifying a match to the first color image at least in part by
accessing a second color image having values in the RGB channels for each of a plurality of points within the second color image;
generating a second pseudo-color image at least in part by applying histogram-equalization transformations to the values in the RGB channels of the second color image independently of the values in the other RGB channels of the second color image, such that the generated second pseudo-color image is invariant to both (i') illumination conditions of another scene depicted in the second color image and (ii') response of another imaging device that acquired the second color image;
generating a three-dimensional RGB histogram of the second pseudo-color image
comparing the RGB histogram of the first pseudo-color image with the RGB histogram of the second pseudo-color image to determine whether the RGB histograms of the first and second pseudo-color images are similar;
in response to determining that the RGB histogram of the second pseudo-color image is similar to the RGB histogram of the first pseudo-color image, identifying the second color image as the match to the first color image; and
in response to determining that the RGB histogram of the second pseudo-color image is dissimilar to the RGB histogram of the first pseudo-color image, identifying the second color image as a mismatch to the first color image.

2. The method of claim 1, where each point within the color image is a pixel.

3. The method of claim 1, where the plurality of points within the color image represents a part of the color image.

4. The method of claim 3, where the part of the color image comprises proximate pixels.

5. The method of claim 1, where said comparing the RGB histogram of the first pseudo-color image with the RGB histogram of the second pseudo-color image is performed based on an intersection method.

6. The method of claim 5, further comprising:
determining that the RGB histograms of the first and second pseudo-color images are similar in response to said comparing resulting in a comparison score larger than a predetermined value; and
determining that the RGB histograms of the first and second pseudo-color images are dissimilar in response to said comparing resulting in a comparison score less than or equal to the predetermined value.

7. The method of claim 1, where
the response of the imaging device that acquired the first color image comprises at least in part spectral sensitivity of a sensor of the imaging device, and
the response of the other imaging device that acquired the second color image comprises at least in part spectral sensitivity of another sensor of the other imaging device.

8. The method of claim 1, where
the response of the imaging device that acquired the first color image corresponds to respective monotonic increasing functions of the R, G and B channels of the first color image, and
the response of the imaging device that acquired the second color image corresponds to respective other monotonic increasing functions of the R, G and B channels of the second color image.

9. The method of claim 1, where
changes in the illumination conditions of the scene depicted in the first color image correspond to multiplications of the R, G and B channels of the first color image by respective scalars, and
changes in the illumination conditions of the other scene depicted in the second color image correspond to multiplications of the R, G and B channels of the second color image by respective other scalars.

10. The method of claim 1, where:
the generated first pseudo-color image also is invariant to transformations of the first color image corresponding to monotonic increasing functions applied to the respective R, G and B channels of the first color image, and
the generated second pseudo-color image also is invariant to a transformation of the second color image corresponding to other monotonic increasing functions applied to the respective R, G and B channels of the first color image.

11. The method of claim 10, where the transformations applied to the first color image that correspond to the monotonic increasing functions and the transformations applied to the second color image that correspond to the other monotonic increasing functions are selected from among gamma and tone-curve corrections.

12. The method of claim 10, where
a transformation applied to the first color image that corresponds to the monotonic increasing functions applied to the respective R, G and B channels of the first color image is based on a first camera curve of the imaging device that acquired the first color image, and
a transformation applied to the second color image that corresponds to the other monotonic increasing functions applied to the respective R, G and B channels of the second color image is based on a second camera curve of the other imaging device that acquired the second color image.

13. A method performed by one or more processes executing on a machine, the method comprising:
accessing a color image depicting an object, the color image being formed of pixels and having at least three color components including red (R), green (G) and blue (B) components, each pixel in the color image having a respective value for each of the R, G and B components;
generating a pseudo-color image at least in part by applying histogram-equalization transformations to the respective R, G and B components of the color image, such that the generated pseudo-color image is invariant to both (I) illumination conditions of the object depicted in the color image and (II) response of an imaging device that acquired the color image,
wherein said applying a histogram-equalization transformation to the respective R, G and B components of the color image comprises, for each pixel in the color image:
(i) determining a first rank of the pixel's R component value relative to the other pixels' R component values,
(ii) determining a second rank of the pixel's G component value relative to the other pixels' G component values, and
(iii) determining a third rank of the pixel's B component value relative to the other pixels' B component values,
wherein said generating the pseudo-color image includes replacing each pixel's R, G and B component values with the corresponding first, second and third ranks, wherein the replacing comprises, for each pixel in the color image:
(i') replacing the pixel's R component value with the pixel's determined first rank,
(ii') replacing the pixel's G component value with the pixel's determined second rank, and
(iii') replacing the pixel's B component value with the pixel's determined third rank; and
segmenting the pseudo-color image to detect a portion of the pseudo-color image corresponding to the object depicted in the color image.

14. The method of claim 13, where the response of the imaging device that acquired the color image comprises at least in part spectral sensitivity of a sensor of the imaging device.

15. The method of claim 13, where the response of the imaging device that acquired the color image corresponds to respective monotonic increasing functions of the R, G and B channels of the color image.

16. The method of claim 13, where changes in the illumination conditions of the object depicted in the color image correspond to multiplications of the R, G and B channels of the color image by respective scalars.

17. The method of claim 13, where the generated pseudo-color image also is invariant to transformations of the color image corresponding to monotonic increasing functions applied to the respective R, G and B channels of the color image.

18. The method of claim 17, where the transformations applied to the color image that correspond to the monotonic increasing functions are selected from among gamma and tone-curve corrections.

19. The method of claim 17, where a transformation applied to the color image that corresponds to the monotonic increasing functions applied to the respective R, G and B channels of the color image is based on a camera-curve of the imaging device that acquired the color image.

20. A non-transitory computer storage medium encoded with a computer program, the program comprising instructions that when executed by one or more computers cause the one or more computers to perform operations comprising:
accessing a first color image having values in RGB channels for each of a plurality of points within the first color image, wherein the RGB channels comprise a red (R) channel, a green (G) channel, and a blue (B) channel;
generating a first pseudo-color image at least in part by applying histogram-equalization transformations to the values in the RGB channels of the first color image independently of the values in the other RGB channels of the first color image, such that the generated first pseudo-color image is invariant to both (i) illumination conditions of a scene depicted in the first color image and (ii) response of an imaging device that acquired the first color image;
generating a three-dimensional RGB histogram of the first pseudo-color image;
identifying a match to the first color image at least in part by
accessing a second color image having values in the RGB channels for each of a plurality of points within the second color image;
generating a second pseudo-color image at least in part by applying histogram-equalization transformations to the values in the RGB channels of the second color image independently of the values in the other RGB channels of the second color image, such that the generated second pseudo-color image is invariant to both (i') illumination conditions of another scene depicted in the second color image and (ii') response of another imaging device that acquired the second color image;
generating a three-dimensional RGB histogram of the second pseudo-color image;
comparing the RGB histogram of the first pseudo-color image with the RGB histogram of the second pseudo-color image to determine whether the RGB histograms of the first and second pseudo-color images are similar;
in response to determining that the RGB histogram of the second pseudo-color image is similar to the RGB histogram of the first pseudo-color image, identifying the second color image as the match to the first color image; and
in response to determining that the RGB histogram of the second pseudo-color image is dissimilar to the RGB histogram of the first pseudo-color image, identifying the second color image as a mismatch to the first color image.

21. The non-transitory computer storage medium of claim 20, where said comparing the RGB histogram of the first pseudo-color image with the RGB histogram of the second pseudo-color image is performed based on an intersection method.

22. The non-transitory computer storage medium of claim 20, where:
the generated first pseudo-color image also is invariant to transformations of the first color image corresponding to monotonic increasing functions applied to the respective R, G and B channels of the first color image, and
the generated second pseudo-color image also is invariant to a transformation of the second color image corresponding to other monotonic increasing functions applied to the respective R, G and B channels of the first color image.

23. A non-transitory computer storage medium encoded with a computer program, the program comprising instructions that when executed by one or more computers cause the one or more computers to perform operations comprising:
accessing a sequence of color frames depicting an object, each of the color frames being formed of pixels and having at least red (R), green (G) and blue (B) components, such that each pixel in the color frame has a respective value for each of the R, G and B components of the color frame;
generating pseudo-color frames at least in part by applying, for each color frame in the sequence of the color frames, histogram-equalization transformations to respective R, G and B components of the color frame, such that each of the generated pseudo-color frames is invariant to both (I) illumination conditions of the object depicted in the corresponding color frame and (II) response of an imaging device that acquired the corresponding color frame, where said applying histogram-equalization transformations to the respective R, G and B components of the color frame comprises, for each pixel in the color frame:
(i) determining a first rank of the pixel's R component value relative to the other pixels' R component values,
(ii) determining a second rank of the pixel's G component value relative to the other pixels' G component values, and
(iii) determining a third rank of the pixel's B component value relative to the other pixels' B component values,
where said generating the pseudo-color frames includes, for each color frame in the sequence of color frames, replacing each pixel's R, G and B component values with the corresponding first, second and third ranks, such that said replacing comprises, for each pixel in the color frame:
(i') replacing the pixel's R component value with the pixel's determined first rank,
(ii') replacing the pixel's G component value with the pixel's determined second rank, and
(iii') replacing the pixel's B component value with the pixel's determined third rank;
segmenting the pseudo-color frames to detect respective portions of the pseudo-color frames corresponding to the object depicted in the sequence of the color frames; and
tracking the object through the sequence of the color frames based on said segmenting of the pseudo-color frames.

24. The non-transitory computer storage medium of claim 23, where each of the generated pseudo-color frames also is invariant to transformations of the color frame corresponding to monotonic increasing functions applied to the respective R, G and B components of the color frame.

\* \* \* \* \*